(12) United States Patent
Haushahn et al.

(10) Patent No.: US 7,281,779 B2
(45) Date of Patent: Oct. 16, 2007

(54) APPARATUS AND METHOD FOR MEASURING THE LENGTH CHANGE OF THE FEED SPINDLE IN AN EXPOSER FOR PRINTING ORIGINALS

(75) Inventors: Volker Haushahn, Kiel (DE); Peter Klaus Melzer, Kiel (DE); Stefan Schmidt, Kiel (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 303 days.

(21) Appl. No.: 10/950,343

(22) Filed: Sep. 24, 2004

(65) Prior Publication Data

US 2005/0104952 A1    May 19, 2005

(30) Foreign Application Priority Data

Nov. 13, 2003    (DE) ................................ 103 53 029

(51) Int. Cl.
B41J 29/393    (2006.01)
B41J 2/435     (2006.01)

(52) U.S. Cl. ........................................ 347/19; 347/224
(58) Field of Classification Search ................. 347/19, 347/2, 3, 237
See application file for complete search history.

(56) References Cited

U.S. PATENT DOCUMENTS

| | | | | |
|---|---|---|---|---|
| 4,392,195 A | * | 7/1983 | Inoue | 700/162 |
| 4,791,435 A | * | 12/1988 | Smith et al. | 347/17 |
| 4,806,034 A | * | 2/1989 | Plummer | 400/279 |
| 5,083,163 A | * | 1/1992 | Brown et al. | 399/128 |
| 5,156,478 A | * | 10/1992 | Jobs | 400/705 |
| 5,963,226 A | * | 10/1999 | Kagami | 347/20 |
| 6,164,848 A | * | 12/2000 | Coufal | 400/76 |
| 6,283,019 B1 | | 9/2001 | Dölves | |
| 7,077,492 B2 | * | 7/2006 | Merz et al. | 347/19 |
| 7,090,419 B2 | * | 8/2006 | Satoh et al. | 400/641 |
| 2001/0012042 A1 | * | 8/2001 | Suganuma | 347/120 |
| 2001/0050760 A1 | | 12/2001 | Uemura et al. | |
| 2003/0058420 A1 | | 3/2003 | Ohba et al. | |
| 2004/0159780 A1 | * | 8/2004 | Fischer et al. | 250/227.14 |

(Continued)

FOREIGN PATENT DOCUMENTS

EP    0 327 929 A2    8/1989

(Continued)

*Primary Examiner*—An H. Do
*Assistant Examiner*—Sarah Al-Hashimi
(74) *Attorney, Agent, or Firm*—Laurence A. Greenberg; Werner H. Stemer; Ralph E. Locher

(57) ABSTRACT

Measuring a feed spindle length change in a printing exposer, having at least one exposure head on a carrier moved axially along the drum in a feed direction by a stepping motor and the spindle, carries out the measurement by determining the number of stepping motor cycles needed by the carrier to travel through a reference section parallel to the feed direction. During calibration, an optimum number of cycles per revolution of the exposure drum is set, and the number of cycles needed to travel through the reference section is determined. During an operating phase, the number of cycles needed to travel through the reference section is determined and a corrected number of cycles per revolution of the exposure drum is determined in accordance with the relationship $K_k = K_0 \times M_x / M_0$. The temperature of the components involved in the measurement is kept constant with a temperature control system.

25 Claims, 3 Drawing Sheets

U.S. PATENT DOCUMENTS

2004/0160475 A1* 8/2004 Satoh et al. .................. 347/36

FOREIGN PATENT DOCUMENTS

| JP | 62278360 A | 12/1987 |
|----|------------|---------|
| JP | 02189071 A | 7/1990  |
| JP | 03292958 A | 12/1991 |
| JP | 05208342 A | 8/1993  |

* cited by examiner

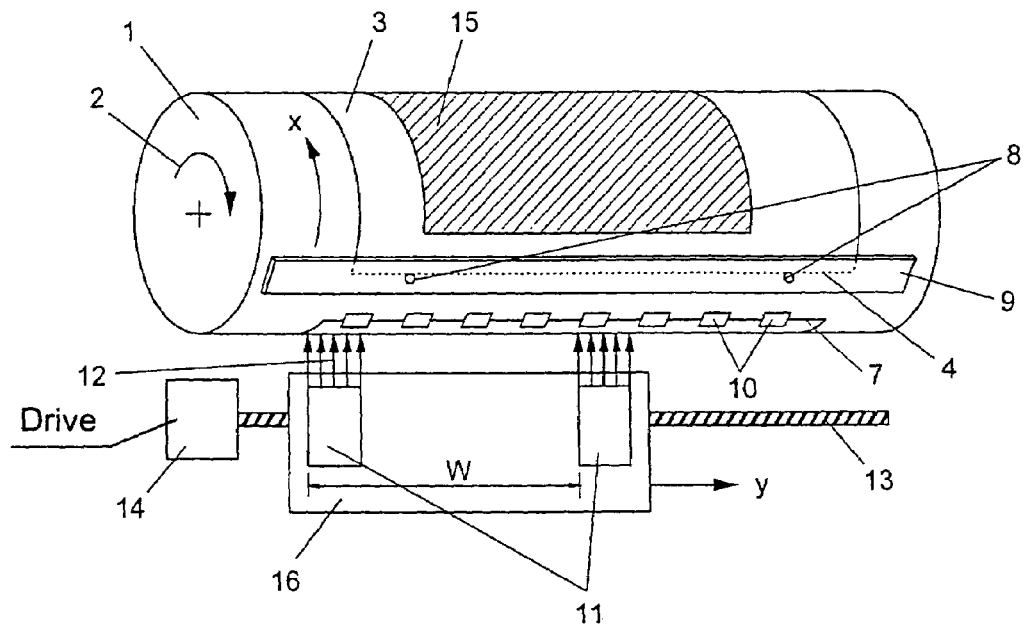
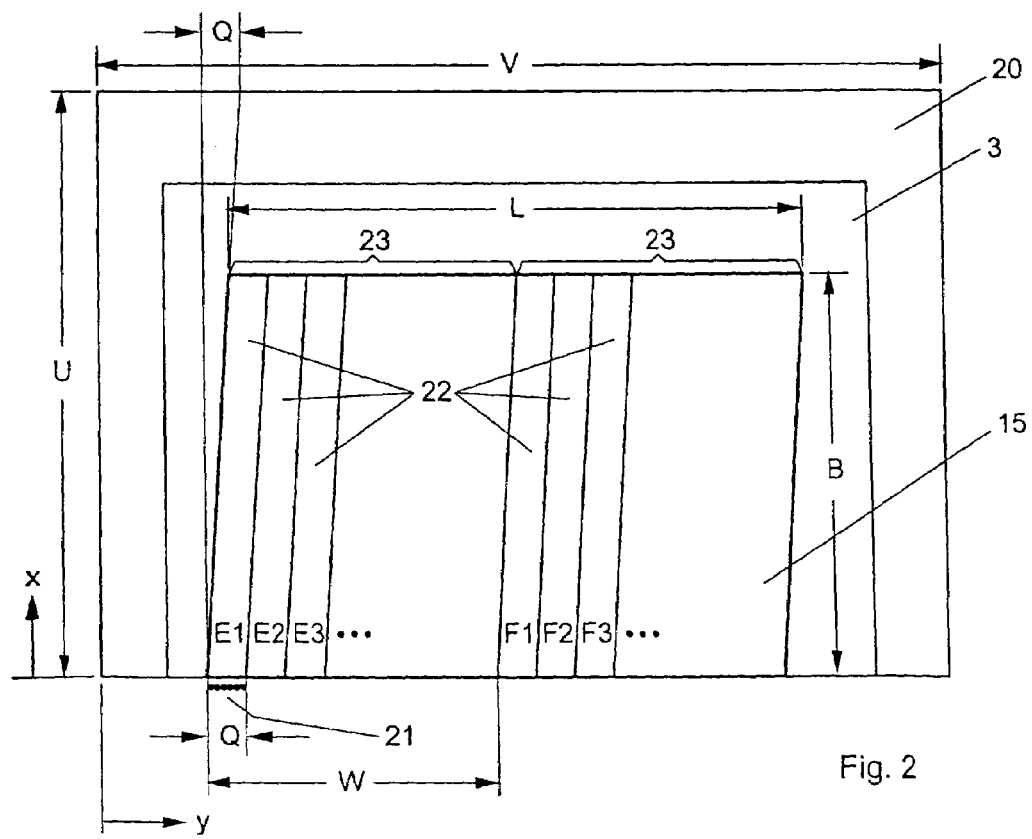
Fig. 1
Fig. 2

APPARATUS AND METHOD FOR MEASURING THE LENGTH CHANGE OF THE FEED SPINDLE IN AN EXPOSER FOR PRINTING ORIGINALS

BACKGROUND OF THE INVENTION

Field of the Invention

The invention pertains to the field of electronic reproduction technology and relates to an apparatus for measuring the length change of the feed spindle in an exposer for printing originals, in particular, in an external drum exposer that records printing originals on printing plates. Furthermore, the invention relates to a method for measuring the length change of the feed spindle and for correcting the measured length changes during the recording of the printing originals.

In reproduction technology, printing originals for printed pages that contain all the elements to be printed such as texts, graphics, and images are produced. For color printing, a separate printing original is produced for each printing ink and contains all the elements that are printed in the respective color. For four-color printing, these are the printing inks cyan, magenta, yellow, and black (CMYK). The printing originals separated in accordance with printing inks are also referred to as color separations. The printing originals are generally screened and, by using an exposer, are exposed onto films, with which printing plates for printing large editions are, then, produced. Alternatively, the printing originals also can be exposed directly onto printing plates in special exposure devices, or they are transferred directly as digital data to a digital printing press. There, the printing-original data is, then, exposed onto printing plates, for example, with an exposing unit integrated into the printing press, before the printing of the edition begins immediately thereafter.

According to the current prior art, the printing originals are reproduced electronically. In such a case, the images are scanned in a color scanner and stored in the form of digital data. Texts are generated with text processing programs and graphics with drawing programs. Using a layout program, the image, text and graphic elements are assembled to form a printed page. Following the separation into the printing inks, the printing originals are, then, present in digital form. The data formats largely used nowadays to describe the printing originals are the page description languages PostScript and PDF (portable document format). In a first step, the PostScript or PDF data is converted in a raster image processor (RIP) into color separation values for the CMYK color separations before the recording of the printing originals. In the process, for each image point, four color separation values are produced as tonal values in the value range from 0 to 100%. The color separation values are a measure of the color densities with which the four printing inks cyan, magenta, yellow, and black have to be printed on the printing material. In special cases, in which printing is carried out with more than four colors (decorative colors), each image point is described by as many color separation values as there are printing inks. The color separation values can be stored, for example, as a data value with 8 bits for each image point and printing ink, with which the value range from 0% to 100% is subdivided into 256 tonal value steps.

The data from a plurality of printed pages is assembled together with the data of further elements, such as register crosses, cut marks and folding marks and print control fields, to form printing originals for a printed sheet. This printed sheet data is, likewise, provided as color separation values (CMYK).

Different tonal values of a color separation to be reproduced may be reproduced in the print only by surface modulation of the printing inks applied, that is to say, by screening. The surface modulation of the printing inks can be carried out, for example, in accordance with a halftone method, in which the various tonal value steps of the color separation data are converted into halftone dots of different size, which are disposed in a regular pattern with periodically repeating halftone cells. A halftone cell for a typical #60 screen includes a square with $\frac{1}{60}$ cm edge length, i.e., a halftone cell has the dimensions 166 µm×166 µm. During the recording of the color separations on a printing plate, the halftone dots in the individual halftone cells are assembled from exposure points that are an order of magnitude smaller than the halftone dots. A typical resolution of the exposure points is, for example, 1000 exposure points per centimeter, that is to say an exposure point has the dimensions 10 µm×10 µm. Conversion of the color separation values into halftone dots takes place in a second step during the further processing of the color separation data in the raster image processor. As a result, the color separation data is converted into high-resolution binary values with only two lightness values (exposed or not exposed) that form the pattern of the modulated dot grid. As such, the printing-original data of each color separation is described in the form of a high-resolution halftone bitmap that, for each of the exposure points on the printed area, contains a bit that indicates whether this exposure point is to be exposed or not.

In the recording devices that are used in electronic reproduction technology for the exposure of printing originals and printing forms, an exposure beam is generated, for example, a laser beam is generated by a laser diode, shaped by optical measures and focused onto the recording material and deflected over the recording material point-by-point and line-by-line by a deflection system. There are also recording devices that, to increase the exposure speed, produce a bundle of laser beams, for example, with a separate laser light source for each laser beam, and expose a plurality of image lines of the printing form simultaneously each time they sweep across the recording material. The printing forms can be exposed onto film material so that what are referred to as color separation films are produced, which are, then, used for the production of printing plates by a photographic copying process. Instead, the printing plates, themselves, can also be exposed in a plate exposer or directly in a digital press, into which a unit for exposing plates is integrated. The recording material can be located on a drum (external drum exposer), in a cylindrical hollow (internal drum exposer), or on a flat surface (flatbed exposer).

Flatbed exposers operate for the most part with a rapidly rotating polygonal mirror, whose mirror surfaces deflect the laser beam transversely over the recording material, while, at the same time, the recording material is moved at right angles to the deflection direction of the laser beam. As such, exposure is carried out recording line-by-recording line. Because, during the movement of the laser beam over the recording material, the length of the light path changes, complicated imaging optics that compensate for the change in size of the exposure point caused by this are needed.

In the case of an internal drum exposer, the material to be exposed is mounted on the inner surface of a partly open hollow cylinder and exposed with a laser beam that is aimed along the cylinder axis onto a deflection device that reflects the laser beam perpendicularly onto the material. The deflection device, a prism, or a mirror, rotates at high speed during operation and, and, at the same time, is moved in the direction of the cylinder axis so that the deflected laser beam describes circular or helical recording lines on the material.

In the case of an external drum exposer, the material to be exposed, in the form of films or printing plates, is mounted on a rotatably mounted drum. As the drum rotates, an exposure head is moved axially along the drum at a relatively short distance. The exposure head is moved in the feed direction by a feed spindle, to which it is connected by a form fit and which is set moving rotationally by a feed drive. The exposure head focuses one or more laser beams onto the drum surface, sweeping over the drum surface in the form of helices. As such, during each drum revolution, one or more recording lines are exposed onto the recording material.

To shorten the exposure time and, therefore, to increase the economy of the exposer, external drum exposers are, preferably, operated with one or more exposure heads that each project a bundle of N laser beams, by exposure optics, as a linear array of exposure points onto the surface of the recording material, oriented in the axial direction of the exposure drum. If there is a plurality of exposure heads, the exposure heads are, for example, disposed on an exposure head carrier that is connected to the feed spindle so that, as a result of the rotational movement of the feed spindle, all the exposure heads are moved along the exposure drum jointly in the feed direction. The exposure heads are disposed in the axial direction of the exposure drum at a distance that is a fraction of the axial drum length, for example, in the case of three exposure heads, one third of the axial drum length. To record a printing original over the entire drum length, the exposure head carrier then needs to be moved by the feed spindle only over a distance that corresponds to the distance between the exposure heads. Each exposure head, then, exposes only one recording band on the printing original. The recording time for the printing original is correspondingly short.

The number of laser beams that each exposure head projects onto the recording material is, for example, N=64, but can also be any other number. If the exposure drum rotates, a plurality of groups of in each case N recording lines are, then, exposed in parallel, winding helically around the surface of the exposure drum. The feed speed of the exposure heads is set such that, after one drum revolution, they have moved in the axial direction of the drum by a distance that corresponds to the width of the N recording lines. As a result, the N recording lines to be exposed during the next drum revolution immediately follow the N recording lines exposed during the preceding drum revolution. In another operating mode, what is referred to as the interleave writing method, the laser beams are not projected as N exposure points with a spacing of one recording line width in each case but with a greater spacing that corresponds to a multiple P of the width of a recording line. For suitable ratios of N and P, during successive drum revolutions, the gaps between the recording lines initially exposed are gradually filled with further recording lines.

Given the high resolution of 1000 recording lines per centimeter, the distance between the recording lines is 10 μm. This distance must always be maintained with high precision. In particular, the next N recording lines following a drum revolution must follow the previously exposed recording lines without any gap. If exposure is carried out with a plurality of exposure heads, this distance must, additionally, be maintained between the last recording line of one exposure head and the first recording line of the adjacent exposure head, that is to say, where the recording bands exposed by the individual exposure heads border one another. If the line spacing is not maintained accurately, disruptive patterns are produced in the recorded printing original, to which the eye is particularly sensitive. This means that the feed distance of the exposure heads per drum revolution must always be constant, regardless of temperature changes or other disruptive influences. In particular, the required accuracy of the feed distance for the exposure of a recording band is ±1 μm.

A stepping motor is normally used as the drive to the feed spindle, and the feed distance is set by the number of stepping motor cycles that the stepping motor receives during a specific number of drum revolutions. In particular, the temperature-induced length change in the feed spindle has the effect that the feed distance of the number of stepping motor cycles set in this way fluctuates. For a typical feed distance of 200 mm, the length change is 2.2 μm per degree Celsius, that is to say, already 22 μm for a temperature change of 10°. This change is so large that the required accuracy of the feed drive cannot be maintained without corrective measures.

To reduce this problem, the printing-original exposer could be set up in an air-conditioned room, but this is associated with restrictions and causes high costs. Another possibility is to air-condition the air in the interior of the printing-original exposer. However, in such a case, various problems are encountered. To reduce the ingress of dust and gases from outside, a slight positive pressure is produced in the interior. The recording material is fixed on the exposure drum with the aid of vacuum. During exposure with powerful laser beams, particles and gases have to be extracted to protect the units in the exposer, in particular, the optical components, against contamination. All these various air movements increase the difficulties and the complexity of implementing an effective air-conditioning system largely sealed off from external conditions for the air in the interior of the exposer. In addition, it is barely possible therewith to maintain the required accuracy, namely to keep the temperature of the feed spindle constant to half a degree. Even methods that measure the temperature of the feed spindle and, if appropriate, of further components closely associated with the feed drive and calculate the length change of the feed distance from this are not sufficiently reliable and accurate.

In the published Japanese Patent document 62-278360 A, a method is described in which two distance sensors in each case measure the distance between the sensors and disks fitted to the start and end of a feed spindle. From this, a length change of the spindle is determined and converted into corrected motor control signals. In the published Japanese Patent document 05-208342 A, a local variation in the length change is calculated from the measured length change of the spindle because the nut segment that engages in the spindle moves only over a part length and only there is the spindle heated by friction. A length correction that varies as a function of the position coordinates is, then, determined.

The previously known methods for correcting the length change of the feed spindle are complicated or they do not reach the high accuracy required in the application in a printing-original exposer.

SUMMARY OF THE INVENTION

It is accordingly an object of the invention to provide an apparatus and method for measuring the length change of the feed spindle in an exposer for printing originals that overcome the hereinafore-mentioned disadvantages of the heretofore-known devices and methods of this general type and that provide an economic, reliable and sufficiently accurate apparatus for measuring the length change of the feed spindle in a printing-original exposer and that also provides a method with which the length change of the feed spindle is measured and corrected such that, during the recording of the printing originals, the requirements on the connection accuracy of the recording lines are met.

According to the invention, a reference section is disposed parallel to the feed spindle. Immediately before the recording of a printing original, a measurement is made as to how many stepping motor cycles are needed to travel through the reference section. From the comparison between this measured number of cycles and a calibrated value of the number of cycles, the number of stepping motor cycles that are needed for each drum revolution, given the current length expansion of the feed spindle, is, then, derived so that the recording lines follow one another exactly in successive drum revolutions.

With the foregoing and other objects in view, there is provided, in accordance with the invention, a method for measuring the length change of a feed spindle in an exposer for recording printing originals, including the steps of fixing a recording material to an exposure drum, providing an exposure head carrier operatively connected to the feed spindle with at least one exposure head adapted to focus exposure beams, axially moving the exposure head carrier along the exposure drum in a feed direction with a stepping motor of a feed drive and the feed spindle to carry the at least one exposure head and focus the exposure beams onto the recording material, the stepping motor moving in stepping motor cycles, during a basic setting of the feed drive, setting an optimum number $K_0$ of the stepping motor cycles per revolution of the exposure drum and determining a number $M_0$ of the stepping motor cycles needed by the exposure head carrier to travel through a reference section substantially parallel to the feed direction, and immediately before recording a printing original, determining a number $M_x$ of the stepping motor cycles needed by the exposure head carrier to travel through the reference section.

With the objects of the invention in view, there is also provided a method for measuring the length change of a feed spindle in an exposer for recording printing originals, a feed spindle being operatively connected to a feed drive and and an exposure head carrier with at least one exposure head transmitting exposure beams, the method including the steps of providing an exposure drum on which is disposed a recording material, axially moving the exposure head carrier along the exposure drum in a feed direction with the feed drive and the feed spindle to focus the exposure beams onto the recording material, during an initial phase of the feed drive, setting an optimum number $K_0$ of the stepping motor cycles per revolution of the exposure drum and determining a number $M_0$ of the stepping motor cycles needed by the exposure head carrier to travel substantially parallel to the feed direction through a reference section, and before recording a printing original, determining a number $M_x$ of the stepping motor cycles needed by the exposure head carrier to travel through the reference section.

In accordance with another mode of the invention, for recording the printing original, setting a corrected number $K_k$ of stepping motor cycles per revolution of the exposure drum in accordance with the relationship:

$$K_k = K_0 \times M_x / M_0.$$

In accordance with a further mode of the invention, the reference section has the same length during the basic setting and immediately before and during the recording of the printing original.

In accordance with an added mode of the invention, the reference section is provided with a constant length during the basic setting and immediately before and during the recording of the printing original.

In accordance with an additional mode of the invention, a starting point and an end point of the reference section is detected with at least one sensor.

In accordance with yet another mode of the invention, the exposure head carrier is provided with a plurality of exposure heads disposed at a distance W from one another and a length of the reference section is set to be substantially equal to the distance W.

With the objects of the invention in view, there is also provided an apparatus for measuring a length change, including an exposer for recording printing originals having a feed spindle, an exposure drum for holding a recording material, a feed drive having a stepping motor moving in stepping motor cycles, an exposure head carrier operatively connected to the feed spindle and axially displaced along the exposure drum in a feed direction by the stepping motor and the feed spindle, and the exposure head carrier carrying at least one exposure head focusing exposure beams onto the recording material, a reference section being disposed substantially parallel to the feed direction, and a counting device for determining a number of the stepping motor cycles needed by the exposure head carrier to travel through the reference section.

In accordance with yet a further feature of the invention, there are provided a reference rod, the reference section having a starting point and an end point, two reference marks fixed to the reference rod, the two reference marks respectively identifying the starting point and the end point of the reference section, and a reference mark sensor fixed to the exposure head carrier and detecting the two reference marks.

In accordance with yet an added feature of the invention, there are provided a reference mark fixed to the exposure head carrier, the reference section having a starting point and an end point, a reference rod, and two reference mark sensors fixed to the reference rod, the sensors identifying the starting point and the end point of the reference section and detecting the reference mark.

In accordance with yet an additional feature of the invention, the reference section has a starting point and an end point, two reference marks are fixed to the exposure head carrier and identify the starting point and the end point of the reference section, and a reference mark sensor is firmly connected to the exposer and detects the two reference marks.

In accordance with again another feature of the invention, the reference section has a starting point and an end point, a reference mark is firmly connected to the exposer, and two reference mark sensors are fixed to the exposure head carrier, the sensors identifying the starting point and the end point of the reference section and detecting the reference mark.

In accordance with again a further feature of the invention, the reference mark sensor(s) is a forked light barrier In accordance with again an added feature of the invention, there is provided a temperature control system operatively connected to at least one of the reference rod and the exposure head carrier and maintaining at least one of the reference rod and the exposure head carrier at a substantially constant temperature.

With the objects of the invention in view, in an exposer for recording printing originals, the exposer having an exposure drum for holding a recording material, a feed drive having a stepping motor moving in stepping motor cycles, an exposure head carrier axially moving along the exposure drum in a feed direction by the stepping motor and the feed spindle, the exposure head carrier carrying at least one exposure head focusing exposure beams onto the recording material, there is also provided an apparatus for measuring a length change of the feed spindle including a reference section being disposed substantially parallel to the feed direction and a counting device for determining the number of the stepping motor cycles needed by the exposure head carrier to travel through the reference section.

Other features that are considered as characteristic for the invention are set forth in the appended claims.

Although the invention is illustrated and described herein as embodied in an apparatus and method for measuring the length change of the feed spindle in an exposer for printing originals, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 1 is a diagrammatic perspective view of a structure of an external drum exposer according to the invention;

FIG. 2 is a diagrammatic illustration of a recorded printing original on an unwound drum surface according to the invention;

DESCRIPTION OF THE PREFERRED EMBODIMENTS

Figure 3:
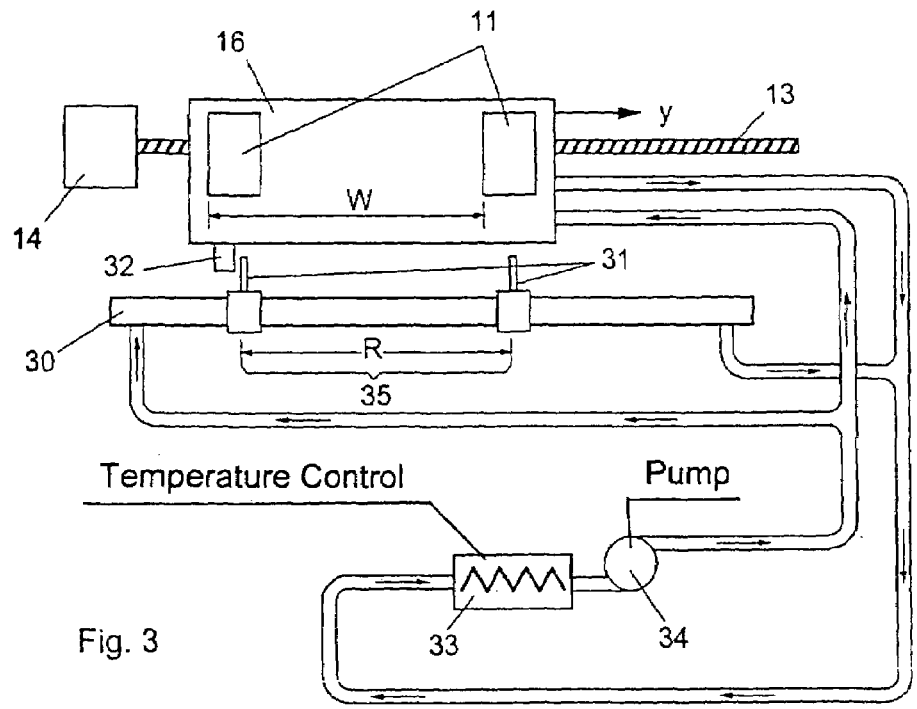
FIG. 3 is a schematic flow diagram of a first embodiment of a system for measuring the length change of a feed spindle according to the invention.

Referring now to the figures of the drawings in detail and first, particularly to FIG. 1 thereof, there is shown, in schematic form, the structure of an external drum exposer for exposing a printing original 15 onto a recording material, a printing plate 3 in this example. An exposure drum 1 is rotatably mounted and can be set into a uniform rotational movement in the direction of the rotation arrow 2 by a non-illustrated rotational drive. An unexposed printing plate 3 is clamped onto the exposure drum 1. The printing plate 3 is clamped on such that its leading edge 4 touches contact pins 8, which are firmly connected to the exposure drum 1 and project beyond the surface of the exposure drum 1. A clamping strip 9 additionally presses the leading edge 4 firmly onto the surface of the exposure drum 1 and, as a result, fixes the leading edge 4 of the printing plate 3. The printing plate 3 is held flat on the drum surface by a vacuum device, not shown in FIG. 1, which attracts the printing plate 3 by suction through holes in the drum surface so that the printing plate 3 is not detached by the centrifugal forces during the rotation of the exposure drum 1. In addition, the trailing edge 7 of the printing plate 3 is prevented from lifting off the exposure drum 1 by clamping pieces 10.

An exposure head 11 or else a plurality of exposure heads 11 that are disposed on a common exposure head carrier 16 are moved axially along the exposure drum 1 at a relatively short distance as the exposure drum 1 rotates. Each exposure head 11 focuses a bundle of exposure beams, N laser beams 12 in this example, onto the drum surface, which sweep over the drum surface in the form of helices. As such, during each drum revolution, one or a plurality of groups of N recording lines is exposed on the recording material in the circumferential direction x. The exposure head carrier 16 is moved in the feed direction y by a feed spindle 13, to which it is connected by a form fit and which is set moving rotationally by a feed drive 14. The feed drive 14 is a stepping motor, it being possible for the feed speed to be set very accurately and changed in fine steps with the frequency of the stepping motor cycles supplied to the motor 14.

As a result of using a plurality of exposure heads 11, the productivity of the exposer is increased, in particular, for the exposure of large-format printing plates 3 because a printing plate 3 can be exposed in a shorter time. In the example of FIG. 1, there are two exposure heads 11, which are disposed at a distance W in the axial direction and each focus a bundle of N laser beams 12 onto the printing plate 3. As a result, the printing plate 3 is exposed simultaneously with two groups of recording lines, which sweep over the drum surface at the axial distance W. In the case of two exposure heads 11, the distance W corresponds to half the maximum length that the exposer can record in the feed direction, in the case of three exposure heads 11, one third of this maximum length, and so on. After the exposure head carrier 16 and, thus, all the exposure heads 11 have covered the feed distance W, the exposure of the printing plate 3 has been completed, regardless of the format of the printing original 15 to be recorded. The more exposure heads 11 there are, the shorter is the feed distance W and, therefore, the exposure time that is used for the recording.

FIG. 2 illustrates the recording of the printing original 15 that results in the case of exposure with N laser beams 12 in each case, on the unwound drum surface 20 having the dimensions U in the circumferential direction x and V in the feed direction y. The printing plate 3 onto which the printing original 15 is recorded with the dimensions B in the circumferential direction and L in the feed direction is clamped onto the drum surface 20. The recording is carried out in each case in parallel with N laser beams 12, which are projected as a linear array of exposure points 21 oriented in the feed direction. The number of exposure points 21 in the array is, for example, N=64. If the exposure drum 1 rotates, recording strips 22 of N parallel recording lines are exposed in each case by the first exposure head 11, being designated E1, E2, E3, and so on in FIG. 2. With the second exposure head 11, at the distance W, further recording strips 22 are exposed at the same time, being designated in FIG. 2 by F1, F2, F3, and so on. Each exposure head 11 exposes a separate recording band 23 that is in each case composed of the recording strips 22. With the resolution A, for example A=100 image points/mm, the strip width Q in mm is:

$$Q = N/A \tag{1}$$

The feed speed of the exposure heads 11 is set such that, after a drum revolution, they have moved in the feed direction by the distance Q, so that the recording strips 22 exposed during each drum revolution follow one another in a seamless manner.

At the high resolution of A=100 recording lines/mm, the distance between the recording lines is 1/A=10 μm. This distance must also be maintained if, following a drum revolution, the next N recording lines follow the previously exposed recording lines, that is to say, the feed distance per drum revolution must have the value Q very accurately. The nominal distance Wn between exposure heads is chosen to be a multiple G of the distance Q, that is to say, a recording band 23 is composed of G recording strips 22 and is exposed with G drum revolutions.

$$Wn = G \times Q \quad (2)$$

Because it is very difficult to set the distance W mechanically accurately to the magnitude Wn, instead of this, using a calibration method not specified in more detail here, the distance W that is actually present is determined once during the first commissioning of the exposer. In the general case, the actual distance W is not an integer multiple of the distance Q. Then, during the exposure of the last recording strip 22 of the recording band 23, only some of the recording lines are driven with image data and the remaining recording lines are filled with zero data, which do not effect any exposure. Likewise, in the first recording strip 22 of the following recording band 23, only some of the recording lines are driven with image data and the remaining recording lines are filled with zero data.

At the end of the exposure, if the last still exposed recording line of the first recording band 23 follows the first exposed recording line of the second recording band 23, the distance between the recording lines must, likewise, be 1/A=10 μm here so that no visible gaps or no overlap are or is produced at the joint between the recording bands 23. The eye is particularly sensitive to such disruptive points in the recorded printing original. This means that the nominal feed distance Wn per G drum revolutions must be maintained very accurately. The required accuracy is ±1 μm.

The feed distance per drum revolution is set by the number of stepping motor cycles that the stepping motor of the feed drive 14 receives during one drum revolution. The stepping motor is, for example, a three-phase stepping motor that is driven with 10,000 stepping motor cycles per spindle revolution. Given a pitch of the feed spindle 13 of 2 mm per spindle revolution, the result is a feed of 0.2 μm per motor cycle. Using such a stepping motor, the feed can be set sufficiently finely. The temperature-induced length change of the feed spindle 13 has the effect that the feed distance for a fixedly set number of stepping motor cycles fluctuates. For a typical feed distance of 200 mm, the length change is 2.2 μm per degree Celsius, that is to say, already 22 μm for a temperature change of 10 degrees. This change is so large that the required accuracy of the feed drive cannot be achieved without corrective measures.

FIG. 3 shows a first embodiment of the apparatus according to the invention for measuring the length change of the feed spindle 13. A reference rod 30 is disposed substantially parallel to the feed spindle 13 with which the exposure head carrier 16 is moved in the feed direction y by the feed drive 14. On the reference rod 30, two reference marks 31 are fixed at a distance R such that they cannot be displaced on the reference rod 30. The distance R is, preferably, equal to the distance W between the exposure heads 11. However, the apparatus can also be used for measuring the length change of the feed spindle 13 if the distances R and W are not equal but of the same order of magnitude. The reference marks 31 identify the starting point and the end point of a reference section 35. Fitted to the exposure head carrier 16 is a reference mark sensor 32, which is used to detect when the exposure head carrier 16 has reached an always identical relative position in relation to a reference mark 31 on its feed travel. The reference mark sensor 32 is, preferably, a forked light barrier that outputs a switching signal as soon as the light path of the forked light barrier is interrupted by a reference mark 31. The reference mark sensor 32 detects the starting point and the end point of the reference section 35. To mark the starting point and the end point of the reference section 35, and also to detect when these points are reached, alternative sensor concepts can also be used, for example, an inductive sensor, a capacitive sensor, a reflective light sensor, and/or a contact sensor. The starting point and the end point of the reference section 35 must, then, be marked in a manner matched to the respective sensor concept(s).

It is critical to the functioning of the measuring apparatus according to the invention that the distance R between the reference marks 31 on the reference rod 30 does not change, regardless of the ambient temperature. To achieve such constancy, the reference rod 30 is brought to a defined temperature, for example, 25° Celsius, by leading a temperature control liquid therethrough. For this purpose, the reference rod 30 is formed as a tube, for example, of metal. The temperature control liquid is led in through a hose at one end of the reference rod 30 and is led away at the other end. The liquid led away is supplied to a temperature control unit 33, where it is heated or cooled, depending on the ambient temperature, in order to keep it at a constant temperature. The liquid is, then, led to the reference rod 30 again. A pump 34 maintains the circuit of the temperature control liquid. By a thermally highly conductive connection between the reference rod 30 and the reference marks 31, the reference marks 31 are, likewise, kept at a constant temperature. The temperature control liquid used is, preferably, water that can be mixed further with suitable additives for protection against corrosion and frost.

The temperature control liquid is also supplied to the exposure head carrier 16, where it is led through ducts, not shown in FIG. 3, in the interior of the exposure head carrier 16 and, as such, brings the entire exposure head carrier 16 to a constant temperature. As a result, first, the distance W between the exposure heads 11 does not change and, second, the reference mark sensor 32 and the associated sensor electronics are also stabilized with respect to temperature changes. For this purpose, the reference mark sensor 32 is thermally highly conductively connected to the exposure head carrier 16 and is enclosed in a metal housing, which is, likewise, connected to the exposure head carrier 16 so that the reference mark sensor 32 also assumes the constant temperature. The temperature control system, preferably, keeps the temperature of the reference rod 30 and of the exposure head carrier 16 constant with a tolerance of ±0.1° Celsius.

By various measures in the sensor electronics of the reference mark sensor 32 formed as a forked light barrier, the switching accuracy of the sensor is increased. These include a temperature-compensated current source of the light-emitting diode in the forked light barrier, a voltage regulator for the supply voltage, a signal amplifier with a Schmitt trigger output, and a very small aperture of the light detector. All the components are located in the form of a hybrid circuit on a ceramic wafer. During its production, vapor-deposited resistances are adjusted by laser trimming so that slight component scatter can be compensated for and the desired operating points of the component characteristics are maintained exactly. The reference marks 31 are, preferably, formed as stable milled parts with a ground knife edge to prevent thermal deformation. Through all of these measures, in conjunction with the temperature control of reference rod 30, reference marks 31, and reference mark sensor 32, a switching accuracy with a tolerance of less than 1 μm is achieved when a reference mark 31 enters the forked light barrier.

In the following text, the method according to the invention will be described, with which the temperature-induced length change of the feed spindle 13 is measured by the above-described apparatus and how, based upon this measurement, the length change is corrected during the recording of the printing original 15. The measurement is divided into two phases, a calibration phase and an operating phase. The calibration phase is carried out at the manufacturer during the first commissioning of the printing-original exposer or following the replacement of an exposure head 11 or another repair that makes renewed calibration necessary. The operating phase relates to a measurement during continuous operation, immediately before each exposure of a new printing original 15.

In the calibration phase, various settings and adjustments of the printing-original exposer are carried out. These also include the setting of the line connection of the recording lines from drum revolution to drum revolution and at the joint between the recording bands 23. During the setting, it is assumed that the ambient temperature has an arbitrary value $T_0$. Specific test originals are exposed, examined for disruptive patterns and assessed visually, the number of stepping motor cycles per drum revolution being varied until the exposure result is optimal with respect to the line connection. The optimum number $K_0$ of stepping motor cycles per drum revolution at the temperature $T_0$ is stored in the printing-original exposer as a calibration value. Immediately before each exposure, by using the set number of cycles of the feed, the reference section 35 between the reference marks 31 is traveled through and the number of stepping motor cycles required overall for the section 35 is determined. The number $M_0$ of stepping motor cycles that are needed for this, and that belongs to the optimum number $K_0$ of stepping motor cycles per drum revolution, is stored in the printing-original exposer as a further calibration value. During the setting of the line connection and during the measurement of the reference section 35, the temperature control system is switched on and keeps the temperature of the exposure head carrier 16 and the reference rod 30 constant. As a result, the reference section 35 is also constant to 1 μm. From the two calibration values $K_0$ and $M_0$, there results the number $G_0$ of drum revolutions between the end points of the reference section 35:

$$G_0 = M_0/K_0 \quad (3)$$

If N recording lines are exposed per drum revolution, the number $H_0$ of recording lines on the reference section 35 at which the previously set optimum line connection of the recording lines is achieved is:

$$H_0 = N \times G_0. \quad (4)$$

The object of correcting the length change of the feed spindle is to keep the number $G_0$ of drum revolutions on the reference section 35 and, respectively, the number $H_0$ of recording lines on the reference section 35 constant in the event of a changed ambient temperature.

During continuous operation of the exposer, it is assumed that the current ambient temperature has the value $T_x$. If $T_x$ is, for example, higher than $T_0$, the feed spindle has expanded and, given an unchanged number of cycles $K_0$ per drum revolution, the feed would run faster. Immediately before the exposure of a new printing original, the reference section 35 between the reference marks 31 is, then, traveled through and the number of stepping motor cycles $M_x$ now required overall for this section is determined. The temperature control system for the exposure head carrier 16 and for the reference rod 30 is switched on again. Because, in the assumed example, the feed runs faster, the number $M_x$ of stepping motor cycles now needed for the reference section 35 will be lower than the calibration value $M_0$. The number of drum revolutions on the reference section 35 would now be only:

$$G_x = G_0 \times M_x/M_0. \quad (5)$$

A recording band 23 that is exposed with G drum revolutions would, then, be wider and the recording bands 23 would overlap. The correction is made by changing the number of stepping motor cycles per drum revolution by the factor $M_x/M_0$. For the corrected number $K_k$ of stepping motor cycles per drum revolution, the result is, then:

$$K_k = K_0 \times M_x/M_0. \quad (6)$$

Using the corrected number $K_k$ of stepping motor cycles, the result given for the number $G_k$ of drum revolutions on the reference section 35 is:

$$G_k = M_x/K_k = (M_x \times M_0)/(K_0 \times M_x) = M_0/K_0 = G_0. \quad (7)$$

Following the correction, therefore, the number of drum revolutions and, therefore, the number of recording lines on the reference section 35 at the changed temperature $T_x$ has the same value that was set during the calibration of the printing-original exposer for the optimum line connection of the recording lines.

Although the method according to the invention has been described in the case in which the recording lines are exposed directly beside one another, that is to say, with a spacing between the recording lines that corresponds to the resolution A, the method can also be applied to what is referred to as the interleave writing method. In the interleave writing method, the recording lines have a greater spacing than corresponds to the resolution A. Given specific combinations of the number of lines N and the line spacing, the gaps between the initially exposed recording lines are gradually filled with further recording lines in successive drum revolutions so that, ultimately, gap-free exposure of the recording material is carried out.

Figure 4:
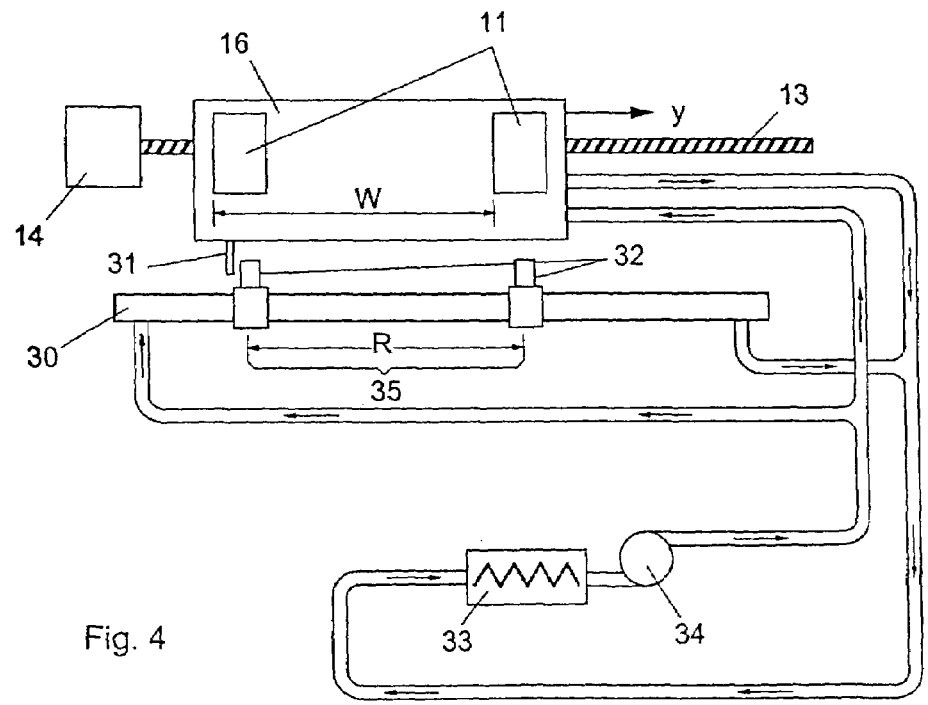
FIG. 4 is a schematic flow diagram of a second embodiment of the system of FIG. 3.

FIG. 4 shows a second embodiment of the apparatus according to the invention. A reference mark 31 is fitted to the exposure head carrier 16 and two reference mark sensors 32, between which the reference section 35 is covered, are fixed to the reference rod 30.

Figure 5:
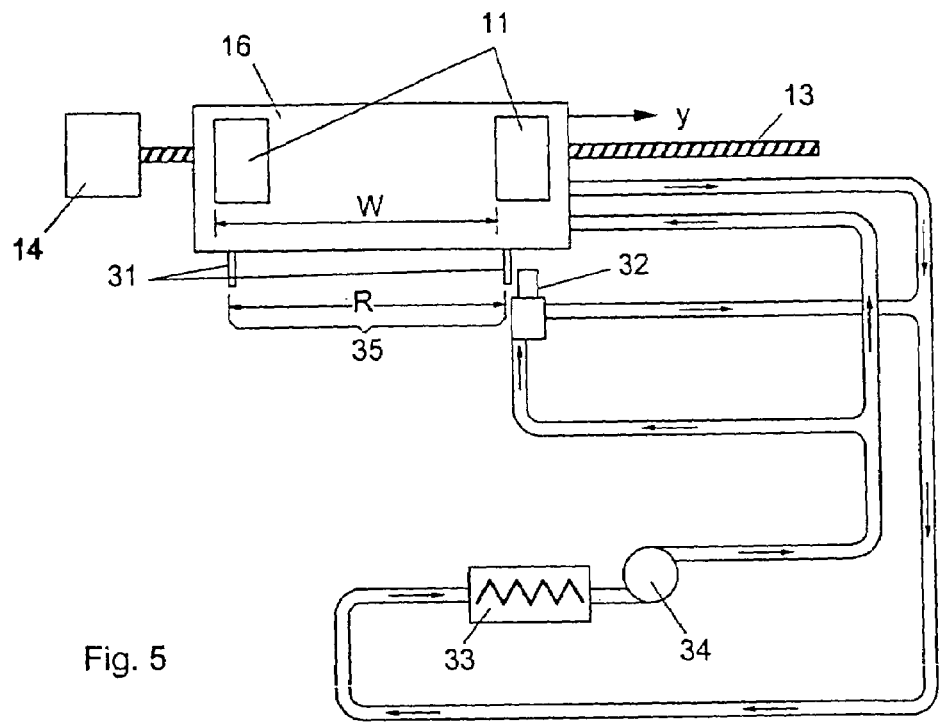
FIG. 5 is a schematic flow diagram of a third embodiment of the system of FIG. 3.

A third embodiment is shown in FIG. 5, in which two reference marks 31 that define the reference section 35 are fitted to the exposure head carrier 16. Because the exposure head carrier 16 is kept at a constant temperature by the temperature control system, the reference section 35 remains constant in this configuration as well. A reference mark sensor 32, which is, likewise, kept at a constant temperature, is firmly connected to the non-illustrated machine base of the exposer. In the embodiment of FIG. 5, no reference rod is needed.

Figure 6:
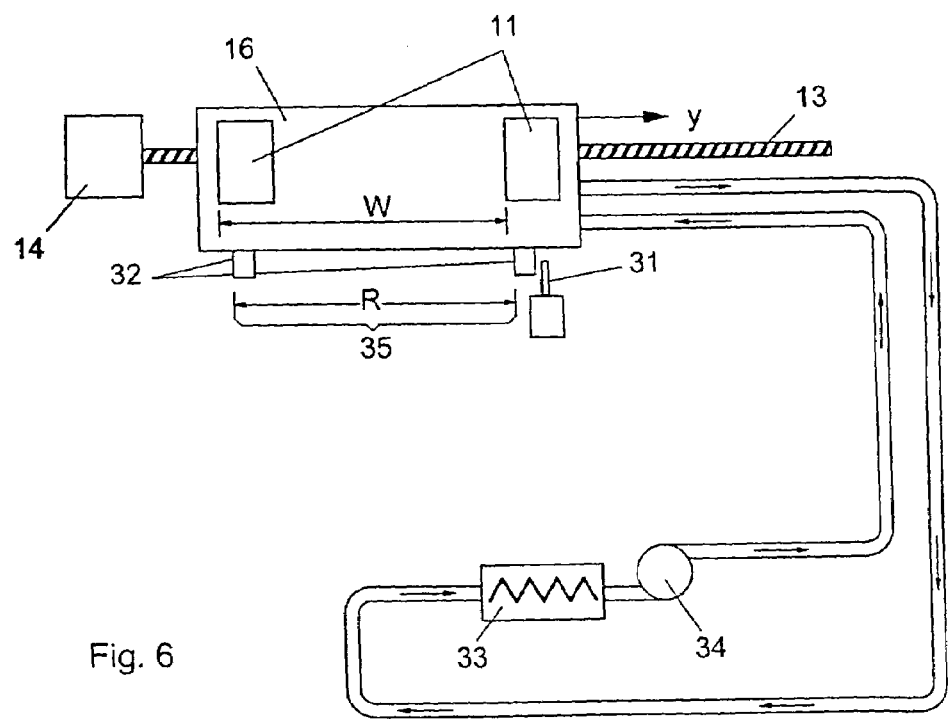
FIG. 6 is a schematic flow diagram of a fourth embodiment of the system of FIG. 3.

FIG. 6 shows a fourth embodiment, in which two reference mark sensors 32 that define the reference section 35 are fitted to the exposure head carrier 16, and a reference mark 31 is firmly connected to the non-illustrated machine base of the exposer. In the embodiment of FIG. 6, no reference rod and no temperature control of the reference mark 31 are needed.

This application claims the priority, under 35 U.S.C. § 119, of German patent application No. 103 53 029.0, filed Nov. 13, 2003; the entire disclosure of the prior application is herewith incorporated by reference.

We claim:

1. A method for measuring the length change of a feed spindle in an exposer for recording printing originals, which comprises:
    fixing a recording material to an exposure drum;
    providing an exposure head carrier with at least one exposure head adapted to focus exposure beams;
    axially moving the exposure head carrier along the exposure drum in a feed direction with a stepping motor of a feed drive and the feed spindle to carry the at least one exposure head and focus the exposure beams onto the recording material, the stepping motor moving in stepping motor cycles;
    during a basic setting of the feed drive, setting an optimum number $K_0$ of the stepping motor cycles per revolution of the exposure drum and determining a number $M_0$ of the stepping motor cycles needed by the exposure head carrier to travel through a reference section substantially parallel to the feed direction; and
    immediately before recording a printing original, determining a number $M_x$ of the stepping motor cycles needed by the exposure head carrier to travel through the reference section.

2. The method according to claim 1, which further comprises, for recording the printing original, setting a corrected number $K_k$ of stepping motor cycles per revolution of the exposure drum in accordance with the relationship:

$$K_k = K_0 \times M_x / M_0.$$

3. The method according to claim 1, wherein the reference section has the same length during the basic setting and immediately before and during the recording of the printing original.

4. The method according to claim 1, which further comprises providing the reference section with a constant length during the basic setting and immediately before and during the recording of the printing original.

5. The method according to claim 1, which further comprises detecting a starting point and an end point of the reference section with at least one sensor.

6. The method according to claim 1, which further comprises:
    providing the exposure head carrier with a plurality of exposure heads disposed at a distance W from one another; and
    setting a length of the reference section to be substantially equal to the distance W.

7. A method for measuring the length change of a feed spindle in an exposer for recording printing originals, a feed spindle being operatively connected to a feed drive and an exposure head carrier with at least one exposure head transmitting exposure beams, the method which comprises:
    providing an exposure drum on which is disposed a recording material;
    axially moving the exposure head carrier along the exposure drum in a feed direction with the feed drive and the feed spindle to focus the exposure beams onto the recording material;
    during an initial phase of the feed drive, setting an optimum number $K_0$ of the stepping motor cycles per revolution of the exposure drum and determining a number $M_0$ of the stepping motor cycles needed by the exposure head carrier to travel substantially parallel to the feed direction through a reference section; and
    before recording a printing original, determining a number $M_x$ of the stepping motor cycles needed by the exposure head carrier to travel through the reference section.

8. The method according to claim 7, which further comprises, for recording the printing original, setting a corrected number $K_k$ of stepping motor cycles per revolution of the exposure drum in accordance with the relationship:

$$K_k = K_0 \times M_x / M_0.$$

9. The method according to claim 7, wherein the reference section has the same length during the basic setting and immediately before and during the recording of the printing original.

10. The method according to claim 7, which further comprises providing the reference section with a constant length during the basic setting and immediately before and during the recording of the printing original.

11. The method according to claim 7, which further comprises detecting a starting point and an end point of the reference section with at least one sensor.

12. The method according to claim 7, which further comprises:
    providing the exposure head carrier with a plurality of exposure heads disposed at a distance W from one another; and
    setting a length of the reference section to be substantially equal to the distance W.

13. An apparatus for measuring a length change, comprising:
    an exposer for recording printing originals having:
        a feed spindle;
        an exposure drum for holding a recording material;
        a feed drive having a stepping motor moving in stepping motor cycles; and
        an exposure head carrier operatively connected to said feed spindle and axially displaced along said exposure drum in a feed direction by said stepping motor and said feed spindle, said exposure head carrier carrying at least one exposure head focusing exposure beams onto the recording material;
    a reference section being disposed substantially parallel to said feed direction; and
    a counting device for determining a number of said stepping motor cycles needed by said exposure head carrier to travel through said reference section.

14. The apparatus according to claim 13, further comprising:
    a reference rod;
    said reference section having a starting point and an end point;
    two reference marks fixed to said reference rod, said two reference marks respectively identifying said starting point and said end point of said reference section; and
    a reference mark sensor fixed to said exposure head carrier and detecting said two reference marks.

15. The apparatus according to claim 13, further comprising:
    a reference mark fixed to said exposure head carrier;
    said reference section having a starting point and an end point;

a reference rod; and two reference mark sensors fixed to said reference rod, said sensors identifying said starting point and said end point of said reference section and detecting said reference mark.

16. The apparatus according to claim 13, wherein:

said reference section has a starting point and an end point;

two reference marks are fixed to said exposure head carrier and identify said starting point and said end point of said reference section; and a reference mark sensor is firmly connected to said exposer and detects said two reference marks.

17. The apparatus according to claim 13, wherein:

said reference section has a starting point and an end point;

a reference mark is firmly connected to said exposer; and two reference mark sensors are fixed to said exposure head carrier, said sensors identifying said starting point and said end point of said reference section and detecting said reference mark.

18. The apparatus according to claim 14, wherein said reference mark sensor is a forked light barrier.

19. The apparatus according to claim 15, wherein said reference mark sensors are forked light barriers.

20. The apparatus according to claim 16, wherein said reference mark sensor is a forked light barrier.

21. The apparatus according to claim 17, wherein said reference mark sensors are forked light barriers.

22. The apparatus according to claim 14, further comprising a temperature control system operatively connected to said reference rod and keeping said reference rod at a constant temperature.

23. The apparatus according to claim 15, further comprising a temperature control system operatively connected to said reference rod and maintaining said reference rod at a substantially constant temperature.

24. The apparatus according to claim 13, which further comprises a temperature control system operatively connected to said exposure head carrier and maintaining said exposure head carrier at a substantially constant temperature.

25. In an exposer for recording printing originals, the exposer having an exposure drum for holding a recording material, a feed drive having a stepping motor moving in stepping motor cycles, an exposure head carrier axially moving along the exposure drum in a feed direction by the stepping motor and the feed spindle, the exposure head carrier carrying at least one exposure head focusing exposure beams onto the recording material, an apparatus for measuring a length change of the feed spindle comprising:

a reference section being disposed substantially parallel to the feed direction; and a counting device for determining the number of the stepping motor cycles needed by the exposure head carrier to travel through said reference section.

* * * * *